(12) United States Patent
Mezzacapo et al.

(10) Patent No.: US 11,321,619 B2
(45) Date of Patent: May 3, 2022

(54) STATE DEPENDENT CALIBRATION OF QUBIT MEASUREMENTS

(71) Applicant: International Business Machines Corporation, Armonk, NY (US)

(72) Inventors: Antonio Mezzacapo, Westchester, NY (US); Richard Chen, Mount Kisco, NY (US); Marco Pistoia, Amawalk, NY (US); Jay M. Gambetta, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 512 days.

(21) Appl. No.: 16/540,782

(22) Filed: Aug. 14, 2019

(65) Prior Publication Data

US 2021/0049482 A1 Feb. 18, 2021

(51) Int. Cl.
*G06N 5/04* (2006.01)
*G06N 10/00* (2022.01)

(52) U.S. Cl.
CPC .............. *G06N 5/04* (2013.01); *G06N 10/00* (2019.01)

(58) Field of Classification Search
CPC ................................ G06N 5/04; G06N 10/00
See application file for complete search history.

(56) References Cited

U.S. PATENT DOCUMENTS

| | | | |
|---|---|---|---|
| 4,783,792 A * | 11/1988 | Akagiri | H04B 14/046 375/244 |
| 7,932,514 B2 * | 4/2011 | Farinelli | G06N 10/00 257/30 |
| 8,156,403 B2 | 4/2012 | Shalvi et al. | |
| 8,386,899 B2 | 2/2013 | Goto et al. | |
| 10,031,887 B2 * | 7/2018 | Raymond | G06N 10/00 |
| 10,332,024 B2 * | 6/2019 | Scheer | G06F 40/111 |
| 10,474,960 B1 * | 11/2019 | Bishop | G06N 10/00 |
| 10,621,140 B2 * | 4/2020 | Raymond | G06N 10/00 |

(Continued)

FOREIGN PATENT DOCUMENTS

WO 2018132444 A1 7/2018

OTHER PUBLICATIONS

Gambetta, et al., Protocols for optimal readout of qubits using a continuous quantum nondemolition measurement, Sep. 17, 2018, 12 Pages.

(Continued)

*Primary Examiner* — Tung S Lau
(74) *Attorney, Agent, or Firm* — Amin, Turocy & Watson, LLP

(57) ABSTRACT

Systems, computer-implemented methods, and computer program products to facilitate state dependent calibration of qubit measurements are provided. According to an embodiment, a system can comprise a memory that stores computer executable components and a processor that executes the computer executable components stored in the memory. The computer executable components can comprise a state prediction component that predicts a readout state of one or more qubits of a quantum circuit. The computer executable components can further comprise a calibration component that calibrates a qubit readout signal based on the readout state to generate a state dependent qubit readout signal to read the one or more qubits.

20 Claims, 10 Drawing Sheets

(56) References Cited

U.S. PATENT DOCUMENTS

| | | | |
|---|---|---|---|
| 10,643,143 B2* | 5/2020 | Bloom | G06N 10/00 |
| 11,164,103 B2* | 11/2021 | Bloom | G06N 10/00 |
| 2013/0343125 A1 | 12/2013 | Gillingham et al. | |
| 2016/0104073 A1* | 4/2016 | Sandberg | G06N 10/00 |
| | | | 257/32 |
| 2017/0206979 A1 | 7/2017 | Cohen et al. | |
| 2018/0225186 A1 | 8/2018 | Kelly | |
| 2019/0042969 A1 | 2/2019 | Hogaboam et al. | |

OTHER PUBLICATIONS

Kandala, et al., Hardware-efficient variational quantum eigensolver for small molecules and quantum magnets, Oct. 16, 2017, 24 Pages.

Mel, et al., The NIST Definition of Cloud Computing, National Institute of Standards and Technology Special Publication 800-145, Sep. 2011, 7 Pages.

\* cited by examiner

STATE DEPENDENT CALIBRATION OF QUBIT MEASUREMENTS

BACKGROUND

The subject disclosure relates to calibration of qubit measurements, and more specifically, to state dependent calibration of qubit measurements.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate state dependent calibration of qubit measurements are described.

According to an embodiment, a system can comprise a memory that stores computer executable components and a processor that executes the computer executable components stored in the memory. The computer executable components can comprise a state prediction component that predicts a readout state of one or more qubits of a quantum circuit. The computer executable components can further comprise a calibration component that calibrates a qubit readout signal based on the readout state to generate a state dependent qubit readout signal to read the one or more qubits.

According to an embodiment, a computer-implemented method can comprise predicting, by a system operatively coupled to a processor, a readout state of one or more qubits of a quantum circuit. The computer-implemented method can further comprise calibrating, by the system, a qubit readout signal based on the readout state to generate a state dependent qubit readout signal to read the one or more qubits.

According to an embodiment, a computer program product that can facilitate state dependent calibration of qubit measurements. The computer program product can comprise a computer readable storage medium having program instructions embodied therewith, the program instructions can be executable by a processing component to cause the processing component to predict, by the processor, a qubit state of one or more qubits of a quantum circuit. The program instructions can also cause the processing component to calibrate, by the processor, a qubit readout signal based on a qubit state prediction to generate a state dependent qubit readout signal to read the one or more qubits.

DETAILED DESCRIPTION

Figure 1:
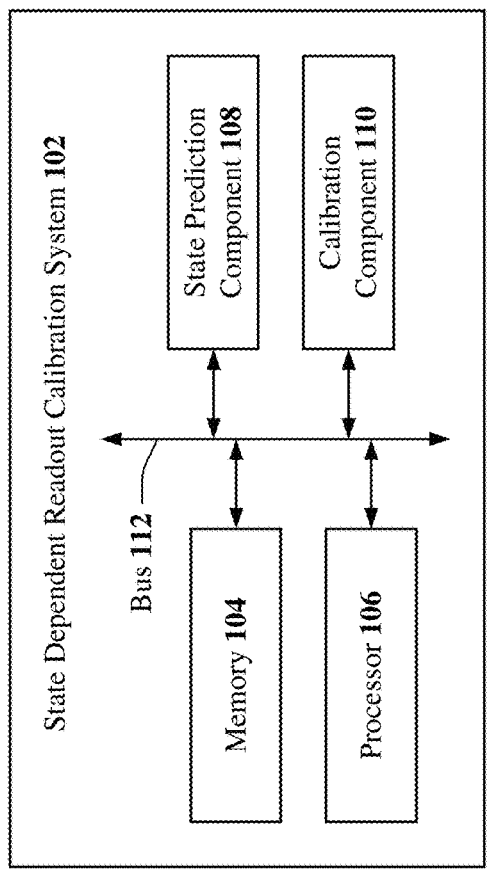
FIG. 1 illustrates a block diagram of an example, non-limiting system that can facilitate state dependent calibration of qubit measurements in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Quantum computing has the potential to solve problems that, due to their computational complexity, cannot be solved, either at all or for all practical purposes, on a classical computer. However, quantum computing requires very specialized skills to, for example, calibrating qubit readout measurements of a quantum circuit that can be implemented in a quantum computing device (e.g., a quantum computer, quantum processor, etc.) and/or simulated on a classic computing device (e.g., via quantum circuit simulation software executed on a classical computer).

The ability of reading out qubit states correctly is essential to the functioning of any quantum processors. Currently, the readout of qubit states on superconducting quantum devices is affected by errors, which can be approximated to a good extent by independent errors on each qubit. At readout time, there is a finite probability of measuring a qubit in the wrong state: for example, we can measure a qubit in the ground state even if it has been prepared in the excited state, and vice versa.

A readout signal corresponding to ground and excited state is calibrated before performing any qubit readout. Typically, signal thresholding distinguishing excited from ground qubit states is done by optimizing readout errors on both excited and ground states.

The most likely readout outcome state for each qubit, after the execution of some quantum circuit, can be predicted in most cases. For example, quantum states produced by trial circuits in variational quantum eigensolvers for quantum chemistry problems typically have most of their amplitudes on Hartree-Fock states, which can be efficiently computed classically. Alternatively, for a black box circuit, one can perform a preliminary iteration of measurements and estimate for each qubit if it is more likely to end in the ground or excited state.

Calibration of qubit readout is done by preparing a qubit state in the ground state (−) and excited state (+), and measuring a readout signal. A sketch of output distributions $P_+$ and $P_-$ for readout signals is described below and presented in FIG. 2. At calibration time, a threshold $T_1$ is picked, that will discriminate between readout of the qubit in the excited state (+) or ground state (−) after execution of a target quantum circuit. Namely, any signal less than $T_1$ will flag excited state (+), and vice versa for the ground state (−).

Readout errors occur because the distributions $P_+$ and $P_-$ overlap. Incorrect qubit assignment statistical errors $\varepsilon_+$ and $\varepsilon_-$ for the excited state (+) and ground state (−), respectively, are proportional to the area under part of the distribution $P_+>T_1$ and $P_-<T_1$, respectively. Typically, using existing techniques, a threshold $T_1$ is picked as to symmetrically minimize the errors $\varepsilon_+$ and $\varepsilon_-$.

The various embodiments of the subject disclosure described herein present systems, computer-implemented methods, and computer program products that can mitigate the impact of readout errors in superconducting qubit processors by implementing the operations summarized here: a) predict the most likely readout outcome alpha={ground, excited} for each qubit, at the end of the execution of a given quantum circuit; and b) based on this estimation, at readout calibration time, pick (e.g., define) a threshold for the excited and/or ground qubit readout signal such that readout errors for the qubit logical basis element alpha are less than for the other logical basis element beta. In this way, the effect of measurement errors will be mitigated as compared to the case in which one does not perform state-dependent calibration of readout signal thresholds. The data illustrated in FIG. 6 and described below provides a numerical example that supports the findings of the various embodiments of the subject disclosure.

FIG. 1 illustrates a block diagram of an example, non-limiting system 100 that can facilitate state dependent calibration of qubit measurements in accordance with one or more embodiments described herein. In some embodiments, system 100 can comprise a state dependent readout calibration system 102, which can be associated with a cloud computing environment. For example, state dependent readout calibration system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

In some embodiments, state dependent readout calibration system 102 and/or components thereof (e.g., state prediction component 108, calibration component 110, execution component 302, readout component 304, readout error component 402, state assignment component 404, etc.) can employ one or more computing resources of cloud computing environment 950 described below with reference to FIG. 9 and/or one or more functional abstraction layers described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.) and/or one or more quantum computing devices (e.g., quantum computer, quantum processor, quantum circuit simulation software, superconducting circuit, etc.) that can be employed by state dependent readout calibration system 102 and/or components thereof to execute one or more operations in accordance with one or more embodiments of the subject disclosure described herein. For instance, state dependent readout calibration system 102 and/or components thereof can employ such one or more classical and/or quantum computing devices to execute one or more mathematical functions and/or equations, one or more computing and/or processing scripts, one or more models (e.g., artificial intelligence (AI) models, machine learning (ML) models, etc.), one or more classical and/or quantum algorithms, and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1. According to multiple embodiments, state dependent readout calibration system 102 can comprise a memory 104, a processor 106, a state prediction component 108, a calibration component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, system 100 and/or state dependent readout calibration system 102 can further comprise various computer and/or computing-based elements described herein with reference to operating environment 800 and FIG. 8. Such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by a classical and/or quantum processor (e.g., processor 106, etc.), can facilitate performance of operations defined by the executable component(s) and/or instruction(s). For example, memory 104 can store computer and/or machine readable, writable, and/ or executable components and/or instructions that, when executed by a classical and/or quantum processor (e.g., processor 106, etc.), can facilitate execution of the various functions described herein relating to state dependent readout calibration system 102, state prediction component 108, calibration component 110, and/or another component associated with state dependent readout calibration system 102 (e.g., execution component 302, readout component 304, readout error component 402, state assignment component 404, etc.), as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors (e.g., classical processor, quantum processor, etc.) and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. Processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

State dependent readout calibration system 102, memory 104, processor 106, state prediction component 108, calibration component 110, and/or another component of state dependent readout calibration system 102 as described herein can be communicatively, electrically, and/or operatively coupled to one another via a bus 112 to perform functions of system 100, state dependent readout calibration system 102, and/or any components coupled therewith. Bus 112 can comprise one or more memory bus, memory controller, peripheral bus, external bus, local bus, quantum bus, and/or another type of bus that can employ various bus architectures. Further examples of bus 112 are described below with reference to system bus 818 and FIG. 8. Such examples of bus 112 can be employed to implement any embodiments of the subject disclosure.

State dependent readout calibration system 102 can comprise any type of component, machine, device, facility, apparatus, and/or instrument that comprises a processor and/or can be capable of effective and/or operative communication with a wired and/or wireless network. All such embodiments are envisioned. For example, state dependent readout calibration system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

State dependent readout calibration system 102 can be coupled (e.g., communicatively, electrically, operatively, optically, etc.) to one or more external systems, sources, and/or devices (e.g., computing devices, communication devices, etc.) via a data cable (e.g., High-Definition Multimedia Interface (HDMI), recommended standard (RS) 232, Ethernet cable, etc.). State dependent readout calibration system 102 can be coupled (e.g., communicatively, electrically, operatively, optically, etc.) to one or more external systems, sources, and/or devices (e.g., computing devices, communication devices, etc.) via one or more networks.

Examples of such one or more networks referenced above can comprise wired and wireless networks, including, but not limited to, a cellular network, a wide area network (WAN) (e.g., the Internet) or a local area network (LAN). For example, state dependent readout calibration system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, state dependent readout calibration system 102 can thus include hardware (e.g., a central processing unit (CPU), a transceiver, a decoder), software (e.g., a set of threads, a set of processes, software in execution) or a combination of hardware and software that facilitates communicating information between state dependent readout calibration system 102 and external systems, sources, and/or devices (e.g., computing devices, communication devices, etc.).

State dependent readout calibration system 102 can comprise one or more computer and/or machine readable, writable, and/or executable components and/or instructions that, when executed by a classical and/or quantum processor (e.g., processor 106, etc.), can facilitate performance of operations defined by such component(s) and/or instruction(s). Further, any component associated with state dependent readout calibration system 102, as described herein with or without reference to the various figures of the subject disclosure, can comprise one or more computer and/or machine readable, writable, and/or executable components and/or instructions that, when executed by a classical and/or quantum processor (e.g., processor 106, etc.), can facilitate performance of operations defined by such component(s) and/or instruction(s). For example, state prediction component 108, calibration component 110, and/or any other components associated with state dependent readout calibration system 102 as disclosed herein (e.g., communicatively, electronically, operatively, and/or optically coupled with and/or employed by state dependent readout calibration system 102), can comprise such computer and/or machine readable, writable, and/or executable component(s) and/or instruction(s). Consequently, state dependent readout calibration system 102 and/or any components associated therewith as disclosed herein, can employ a classical and/or quantum processor (e.g., processor 106, etc.) to execute such computer and/or machine readable, writable, and/or executable component(s) and/or instruction(s) to facilitate performance of one or more operations described herein with reference to state dependent readout calibration system 102 and/or any such components associated therewith.

State dependent readout calibration system 102 can facilitate performance of operations executed by and/or associated with state prediction component 108, calibration component 110, and/or another component associated with state dependent readout calibration system 102 as disclosed herein (e.g., execution component 302, readout component 304, readout error component 402, state assignment component 404 etc.). For example, as described in detail below, state dependent readout calibration system 102 can facilitate (e.g., via processor 106, a quantum processor, etc.): predicting a readout state of one or more qubits of a quantum circuit; and/or calibrating a qubit readout signal based on the readout state to generate a state dependent qubit readout signal to read the one or more qubits.

State dependent readout calibration system 102 can further facilitate (e.g., via processor 106, a quantum processor, etc.): define a biased threshold value of the qubit readout signal that is indicative of the readout state; execute the quantum circuit based on the state dependent qubit readout signal; read the one or more qubits based on the state dependent qubit readout signal; determine a qubit assignment statistical error value based on a biased threshold value of the qubit readout signal that is indicative of the readout state; assign a qubit state to the one or more qubits based on state dependent qubit readout performed on the one or more qubits using the state dependent qubit readout signal; and/or generate the state dependent qubit readout signal to facilitate reduced readout error of the one or more qubits.

In some embodiments, state prediction component 108 can predict a readout state (also referred to herein as qubit state and quantum state) of one or more qubits of a quantum circuit. For example, state prediction component 108 can predict a qubit state that can be determined subsequently at readout time, where such a qubit state can comprise a ground state (−) or an excited state (+) of one or more qubits of a quantum circuit (e.g., a superconducting circuit). State prediction component 108 can predict a readout state (e.g., ground state (−), excited state (+)) of one or more qubits of a quantum circuit by measuring the state of the one or more qubits of the quantum circuit at the end of the execution of the quantum circuit and/or readout of the one or more qubits by employing one or more of the state prediction strategies described below and/or another state prediction strategy.

In an example, state prediction component 108 can predict a readout state (e.g., ground state (−), excited state (+)) of one or more qubits of a quantum circuit by estimating large amplitudes of the output quantum state based on classical approximations (e.g., Hartree-Fock states). For instance, quantum states produced by trial circuits in variational quantum eigensolvers for quantum chemistry problems typically have most of their amplitudes on Hartree-Fock states, which can be efficiently computed classically (e.g., via state prediction component 108). In an example of sampling from quantum chemistry ground states, ground state of quantum chemistry system expressed in a molecular basis, the Hartree-Fock state has typically the largest component. The Hartree-Fock state is expressed in the qubit logical basis, so each qubit state for it is known.

Alternatively, in an example for a black box circuit, state prediction component 108 can perform a preliminary iteration of measurements and estimate for each qubit whether it is more likely to end in the ground state (−) or the excited state (+). In the example of a black box quantum circuit, the state of all qubits at the end of the execution of a given quantum circuit is measured, and the most probable outcome for each qubit can be predicted. For instance, state prediction component 108 can employ quantum circuit simulation software to simulate execution of a certain quantum circuit (e.g., a superconducting circuit) and/or readout of one or more qubits of the quantum circuit to measure the state of each qubit and determine the most probable readout outcome for each qubit. In another example, execution a certain quantum circuit (e.g., a superconducting circuit) and/or readout of one or more qubits of the quantum circuit can be performed experimentally using a vector network analyzer (VNA) that can transmit to, and receive from, each qubit of the quantum circuit (e.g., via a microwave resonator) microwave signals that can be measured by state prediction component 108 to determine the state of each qubit and the most probable readout outcome for each qubit.

Once state prediction component 108 predicts the most probable outcome for each qubit, calibration component 110 can bias the readout threshold as described below to reduce the readout error for the qubit state which corresponds to the most probable outcome.

In some embodiments, calibration component 110 can calibrate a qubit readout signal based on a readout state prediction (qubit state prediction) to generate a state dependent qubit readout signal to read one or more qubits. For example, calibration component 110 can calibrate a qubit readout signal based on a qubit state prediction of one or more qubits of a quantum circuit to generate a state dependent qubit readout signal that can be used to read the one or more qubits (e.g., via execution component 302 and readout component 304 as described below with reference to FIG. 4). For instance, calibration component 110 can calibrate a qubit readout signal based on a qubit state prediction of each qubit of a quantum circuit, where such qubit state prediction can comprise a ground state (−) or an excited state (+) that can be predicted by state prediction component 108 as described above.

Calibration component 110 can calibrate a qubit readout signal based on a readout state prediction (e.g., ground state (−), excited state (+)) of one or more qubits to generate a state dependent qubit readout signal by defining a biased threshold value of the qubit readout signal that is indicative of the readout state prediction. For example, calibration component 110 can calibrate a qubit readout signal based on a readout state prediction (e.g., ground state (−), excited state (+)) of a qubit to generate a state dependent qubit readout signal by defining a biased threshold value $T_2$ or $T_3$ of the qubit readout signal as illustrated and described below with reference to FIG. 2, where such biased threshold value $T_2$ or $T_3$ can be indicative of the readout state prediction.

Figure 2:
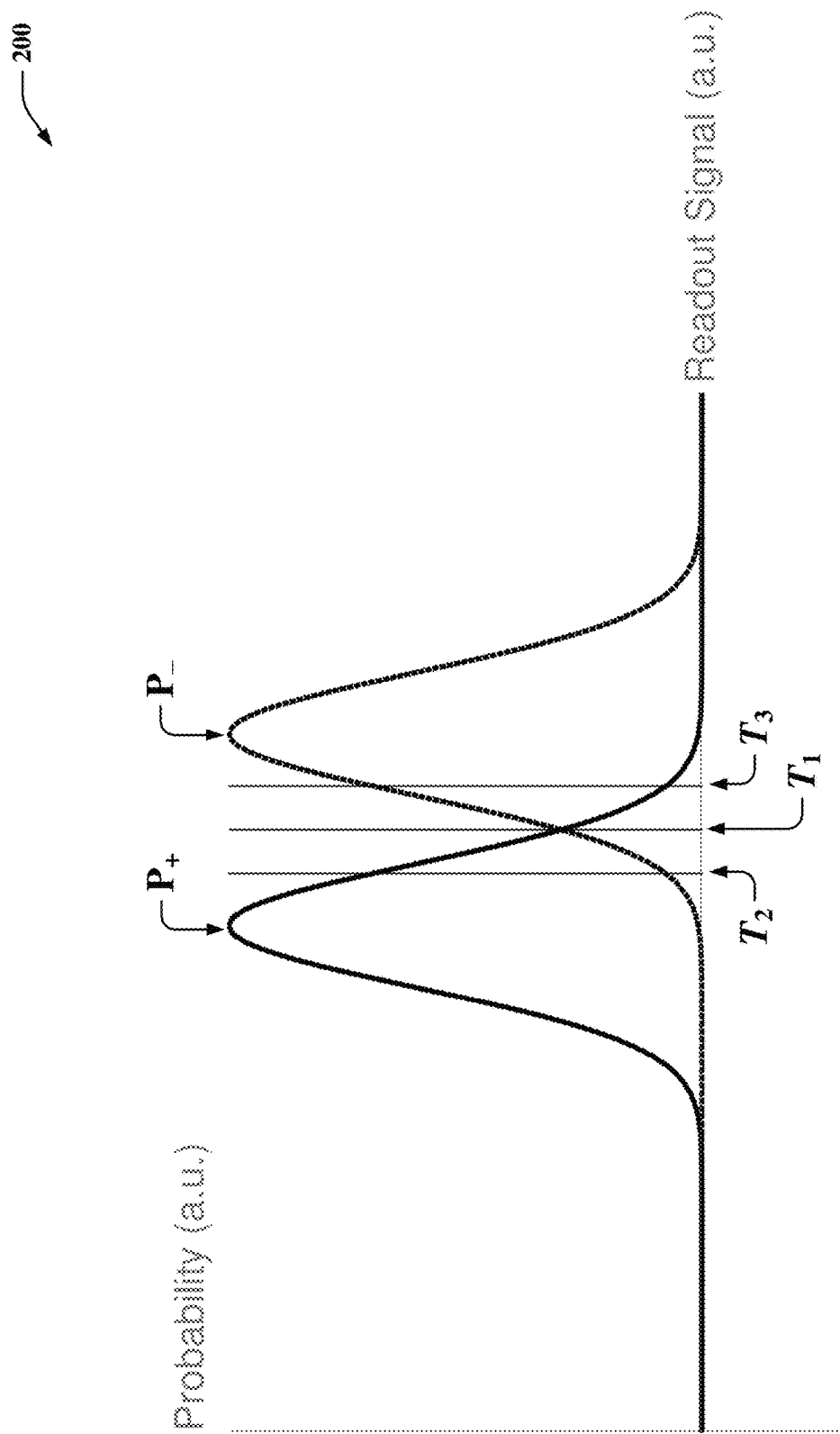
FIG. 2 illustrates a diagram of an example, non-limiting diagram that can facilitate state dependent calibration of qubit measurements in accordance with one or more embodiments described herein.

FIG. 2 illustrates a diagram of an example, non-limiting diagram 200 that can facilitate state dependent calibration of qubit measurements in accordance with one or more embodiments described herein. Repetitive description of like elements and/or processes employed in various embodiments described herein is omitted for sake of brevity.

In some embodiments, diagram 200 can comprise a plot of probability distributions $P_+$ and $P_-$ corresponding to readout signals of an excited state (+) and a ground state (−), respectively. As depicted in FIG. 2, probability distributions $P_+$ and $P_-$ can be expressed along the Y-axis in terms of an arbitrary unit (denoted a.u. in FIG. 2) and the corresponding readout signals of an excited state (+) and a ground state (−) can be expressed along the X-axis in terms of another arbitrary unit (denoted a.u. in FIG. 2).

As an example, if an excited state (+) is determined by state prediction component 108 to be the most probable outcome for a given qubit, threshold $T_3$ illustrated in FIG. 2 can be defined by calibration component 110 at calibration time for that qubit, where such threshold $T_3$ can comprise a readout signal value expressed as some arbitrary unit. Conversely, in another example, if a ground state (−) is determined by state prediction component 108 to be the most probable outcome for a given qubit, threshold $T_2$ illustrated in FIG. 2 can be defined by calibration component 110 at calibration time for that qubit, where such threshold $T_2$ can comprise a readout signal value expressed as some arbitrary unit.

Calibration component 110 can bias the excited state (+)/ground state (−) threshold for the qubit readout towards higher or lower signal values, for example, by defining thresholds $T_3$ or $T_2$, as illustrated in FIG. 2. For instance, in defining a threshold at $T_2<T_1$, calibration component 110 can bias the excited state (+)/ground state (−) threshold for the qubit readout towards a lower signal value, thereby setting conditions for a readout error for the ground state (−) to be much less than that of the excited state (+), which can be expressed as $\varepsilon_- \ll \varepsilon_+$. Conversely, as another example, in defining a threshold at $T_3>T_1$, calibration component 110 can bias the excited state (+)/ground state (−) threshold for the qubit readout towards a higher signal value, thereby setting conditions for a readout error for the excited state (+) to be much less than that of the ground state (−), which can be expressed as $\varepsilon_+ \ll \varepsilon_-$.

In calibrating a readout signal by defining such a threshold value $T_2$ or $T_3$ as described above, calibration component 110 can thereby generate a state dependent qubit readout signal that can be used to read the qubit. For example, in calibrating a readout signal by defining a threshold value at $T_2<T_1$, calibration component 110 can thereby generate a ground state (−) dependent qubit readout signal that can be used to read the qubit. Conversely, as another example, in calibrating a readout signal by defining a threshold value at $T_3 > T_1$, calibration component 110 can thereby generate an excited state (+) dependent qubit readout signal that can be used to read the qubit.

Figure 3:
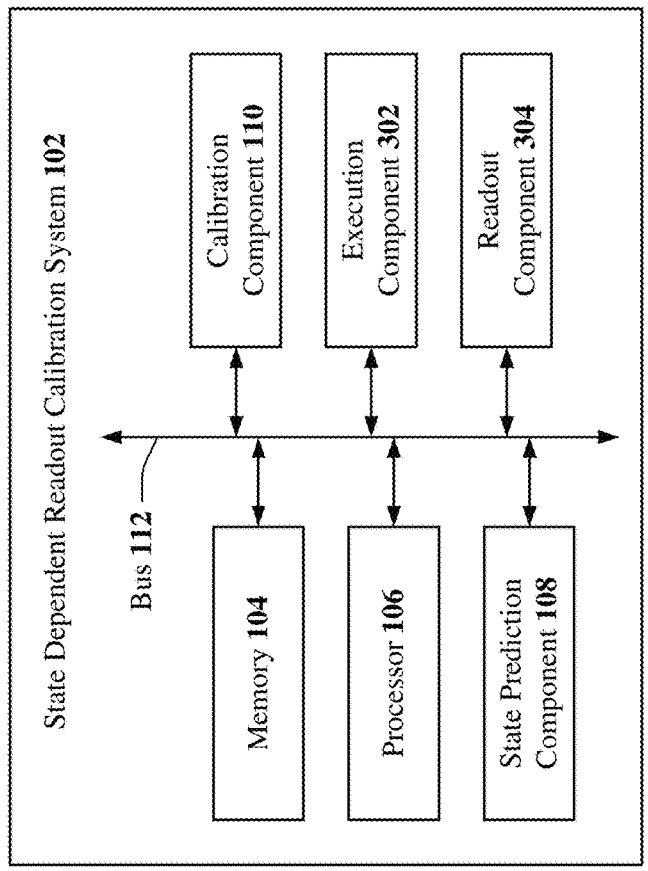
FIG. 3 illustrates a block diagram of an example, non-limiting system that can facilitate state dependent calibration of qubit measurements in accordance with one or more embodiments described herein.

FIG. 3 illustrates a block diagram of an example, non-limiting system 300 that can facilitate state dependent calibration of qubit measurements in accordance with one or more embodiments described herein. Repetitive description of like elements and/or processes employed in various embodiments described herein is omitted for sake of brevity. In some embodiments, system 300 can comprise an execution component 302 and/or a readout component 304.

In some embodiments, execution component 302 can execute a quantum circuit based on a state dependent qubit readout signal. For example, execution component 302 can execute a quantum circuit based on (e.g., using) a ground state (−) dependent qubit readout signal and/or an excited state (+) dependent qubit readout signal that can be generated by calibration component 110 at calibration time as described above with reference to FIGS. 1 and 2.

In an example, execution component 302 can comprise and/or employ quantum circuit simulation software that can be run on a classical computing device (e.g., a classical computer) to execute a quantum circuit based on (e.g., using) a state dependent qubit readout signal (e.g., a ground state (−) dependent readout signal or an excited state (+) dependent qubit readout signal). In another example, execution component 302 can comprise and/or employ a vector network analyzer (VNA) to execute (e.g., via transmitting microwave signals to one or more qubits of) a quantum circuit based on (e.g., using) a state dependent qubit readout signal (e.g., a ground state (−) dependent readout signal or an excited state (+) dependent qubit readout signal).

In some embodiments, readout component 304 can read (readout) one or more qubits based on a state dependent qubit readout signal. For example, readout component 304 can read one or more qubits of a quantum circuit that has been executed (e.g., via execution component 302 as described above) based on (e.g., using) a ground state (−) dependent qubit readout signal that can be generated by calibration component 110 at calibration time as described above with reference to FIGS. 1 and 2. In another example, readout component 304 can read one or more qubits of a quantum circuit that has been executed (e.g., via execution component 302 as described above) based on (e.g., using) an excited state (+) dependent qubit readout signal that can be generated by calibration component 110 at calibration time as described above with reference to FIGS. 1 and 2.

In an example, readout component 304 can comprise and/or employ quantum circuit simulation software that can be run on a classical computing device (e.g., a classical computer) to read one or more qubits of a quantum circuit that has been executed based on (e.g., using) such a state dependent qubit readout signal described above (e.g., a ground state (−) dependent readout signal or an excited state (+) dependent qubit readout signal). In another example, readout component 304 can comprise and/or employ a vector network analyzer (VNA) to read (e.g., via receiving microwave signals reflected from) one or more qubits of a quantum circuit that has been executed based on (e.g., using) such a state dependent qubit readout signal described above (e.g., a ground state (−) dependent readout signal or an excited state (+) dependent qubit readout signal). For instance, readout component 304 can comprise a readout device (e.g., a microwave resonator) that can be coupled to one or more qubits of a quantum circuit, where such a readout device can be stimulated using a VNA and a state dependent qubit readout signal to readout responses of the one or more qubits (e.g., via stimulating one or more harmonics, modes, tones, and/or channels of the readout device using microwave signals transmitted by the VNA). In this example, such responses can include, but are not limited to, qubit responses, dispersive readouts of a qubit, qubit state information, quantum information, qubit logic state, qubit response functions, microwave port responses, admittance functions (matrices), multiport admittance functions (matrices), impedance functions (matrices), and/or another response.

Figure 4:
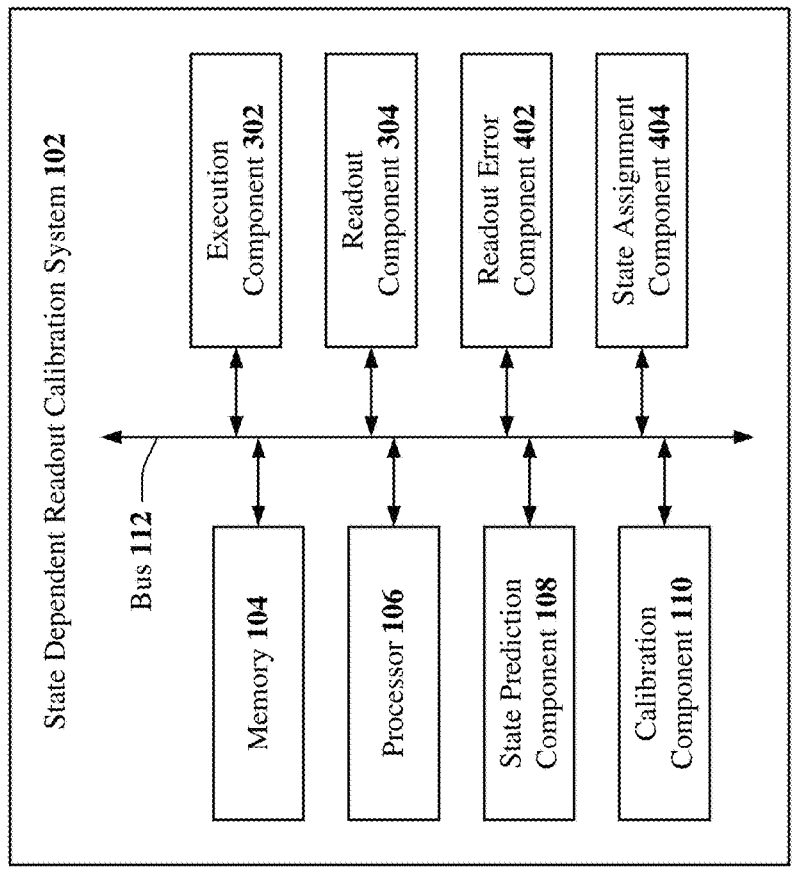
FIG. 4 illustrates a block diagram of an example, non-limiting system that can facilitate state dependent calibration of qubit measurements in accordance with one or more embodiments described herein.

FIG. 4 illustrates a block diagram of an example, non-limiting system 400 that can facilitate state dependent calibration of qubit measurements in accordance with one or more embodiments described herein. Repetitive description of like elements and/or processes employed in various embodiments described herein is omitted for sake of brevity. In some embodiments, system 400 can comprise a readout error component 402 and/or a state assignment component 404.

In some embodiments, readout error component 402 can determine a qubit assignment statistical error value based on a biased threshold value of a qubit readout signal that is indicative of a readout state. For example, readout error component 402 can determine a qubit assignment statistical error value E based on a biased threshold value defined by calibration component 110 at a threshold value of $T_2 < T_1$ of a qubit readout signal as illustrated in FIG. 2, where such a biased threshold value is indicative of a ground state (−) readout state. In another example, readout error component 402 can determine a qubit assignment statistical error value $\varepsilon_+$ based on a biased threshold value defined by calibration component 110 at a threshold value of $T_3 > T_1$ of a qubit readout signal as illustrated in FIG. 2, where such a biased threshold value is indicative of an excited state (+) readout state.

In an example, readout error component 402 can determine a qubit assignment statistical error value E based on such a biased threshold value of $T_2 < T_1$ of a qubit readout signal by calculating (e.g., via processor 106) the area under the probability distribution P_ curve illustrated in FIG. 2 for all readout signal values equal to and less than $T_2$. In this example, such a qubit assignment statistical error value E can be used to confirm that defining a threshold at $T_2 < T_1$ can bias the excited state (+)/ground state (−) threshold for the qubit readout towards a lower signal value, thereby setting conditions for a readout error for the ground state (−) to be much less than that of the excited state (+), which can be expressed as $\varepsilon_- \ll \varepsilon_+$.

In another example, readout error component 402 can determine a qubit assignment statistical error value $\varepsilon_+$ based on such a biased threshold value of $T_3 > T_1$ of a qubit readout signal by calculating (e.g., via processor 106) the area under the probability distribution $P_+$ curve illustrated in FIG. 2 for all readout signal values equal to and greater than $T_3$. In this example, such a qubit assignment statistical error value $\varepsilon_+$ can be used to confirm that defining a threshold at $T_3 > T_1$ can bias the excited state (+)/ground state (−) threshold for the qubit readout towards a higher signal value, thereby setting conditions for a readout error for the excited state (+) to be much less than that of the ground state (−), which can be expressed as $\varepsilon_+ \ll \varepsilon_-$.

In some embodiments, state assignment component 404 can assign a qubit state to one or more qubits based on state dependent qubit readout performed on such one or more qubits using a state dependent qubit readout signal. For example, state assignment component 404 can assign a ground state (−) to one or more qubits based on a ground state (−) dependent qubit readout performed (e.g., via execution component 302 and readout component 304) on such one or more qubits using a ground state (−) dependent qubit readout signal as described above with reference to FIG. 3. In another example, For example, state assignment component 404 can assign an excited state (+) to one or more qubits based on an excited state (+) dependent qubit readout performed (e.g., via execution component 302 and readout component 304) on such one or more qubits using an excited state (+) dependent qubit readout signal as described above with reference to FIG. 3.

To facilitate such assignment of such a qubit state as described above, state assignment component 404 can, for instance, analyze and/or measure each qubit response(s) to such a state dependent qubit readout signal used to execute a quantum circuit comprising the one or more qubits (e.g., analyze and/or measure microwave signals reflected by each qubit in response to stimulating it with the state dependent qubit readout signal) and assign a ground state (−) or an excited state (+) to each qubit based on such an analysis and/or measurement. For example, state assignment component 404 can analyze and/or measure responses readout by readout component 304 when coupled to a qubit that can be stimulated based on a state dependent qubit readout signal using execution component 302. In this example, such responses can include, but are not limited to, qubit responses, dispersive readouts of a qubit, qubit state information, quantum information, qubit logic state, qubit response functions, microwave port responses, admittance functions (matrices), multiport admittance functions (matrices), impedance functions (matrices), and/or another response.

Figure 5:
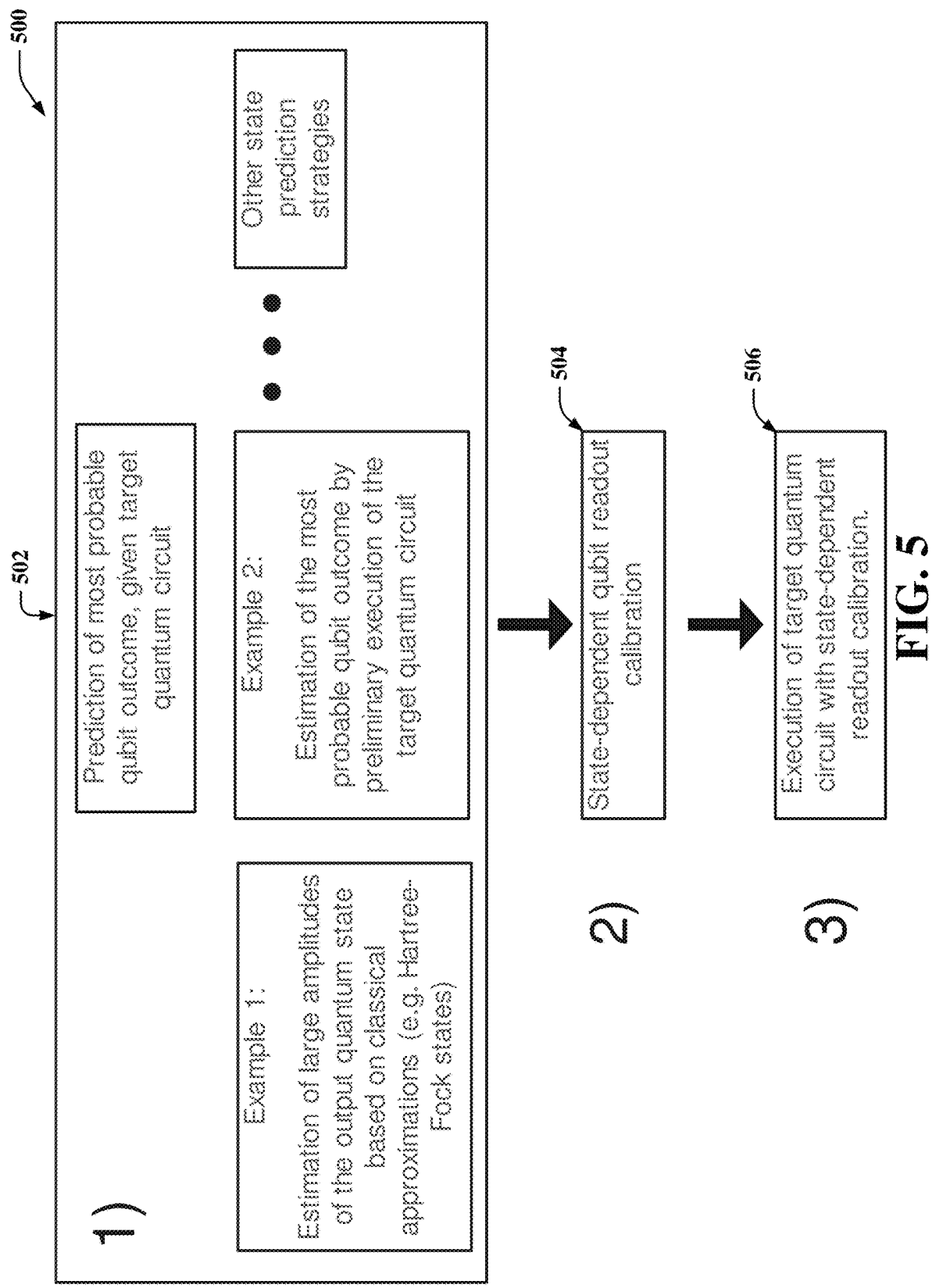
FIG. 5 illustrates a flow diagram of an example, non-limiting computer-implemented method that can facilitate state dependent calibration of qubit measurements in accordance with one or more embodiments described herein.

FIG. 5 illustrates a flow diagram of an example, non-limiting computer-implemented method 500 that can facilitate state dependent calibration of qubit measurements in accordance with one or more embodiments described herein. Repetitive description of like elements and/or processes employed in various embodiments described herein is omitted for sake of brevity.

In some embodiments, at 502, computer-implemented method 500 can comprise prediction of the most probable qubit outcome (e.g., qubit state prediction), given a target quantum circuit, which can be performed via state prediction component 108 as described above with reference to FIG. 1. For example, state prediction component 108 can predict the most probable qubit outcome, given a target quantum circuit, by performing an estimation of large amplitudes of the output quantum state based on classical approximations (e.g., Hartree-Fock states) as illustrated in FIG. 5. In another example, state prediction component 108 can predict the most probable qubit outcome, given target quantum circuit, by performing an estimation of the most probable qubit outcome by preliminary execution of the target quantum circuit as illustrated in FIG. 5. In another example, state prediction component 108 can predict the most probable qubit outcome, given target quantum circuit, by implementing other state prediction strategies as illustrated in FIG. 5.

In some embodiments, at 504, computer-implemented method 500 can comprise state dependent qubit readout calibration, which can be performed via calibration component 110 as described above with reference to FIGS. 1 and 2. In some embodiments, at 506, computer-implemented method 500 can comprise execution of the target quantum circuit with the state dependent readout calibration, which can be performed via execution component 302 using a ground state (−) dependent readout signal or an excited state (+) dependent qubit readout signal generated (e.g., calibrated) by calibration component 110 as described above with reference to FIGS. 1, 2, and 3.

Figure 6:
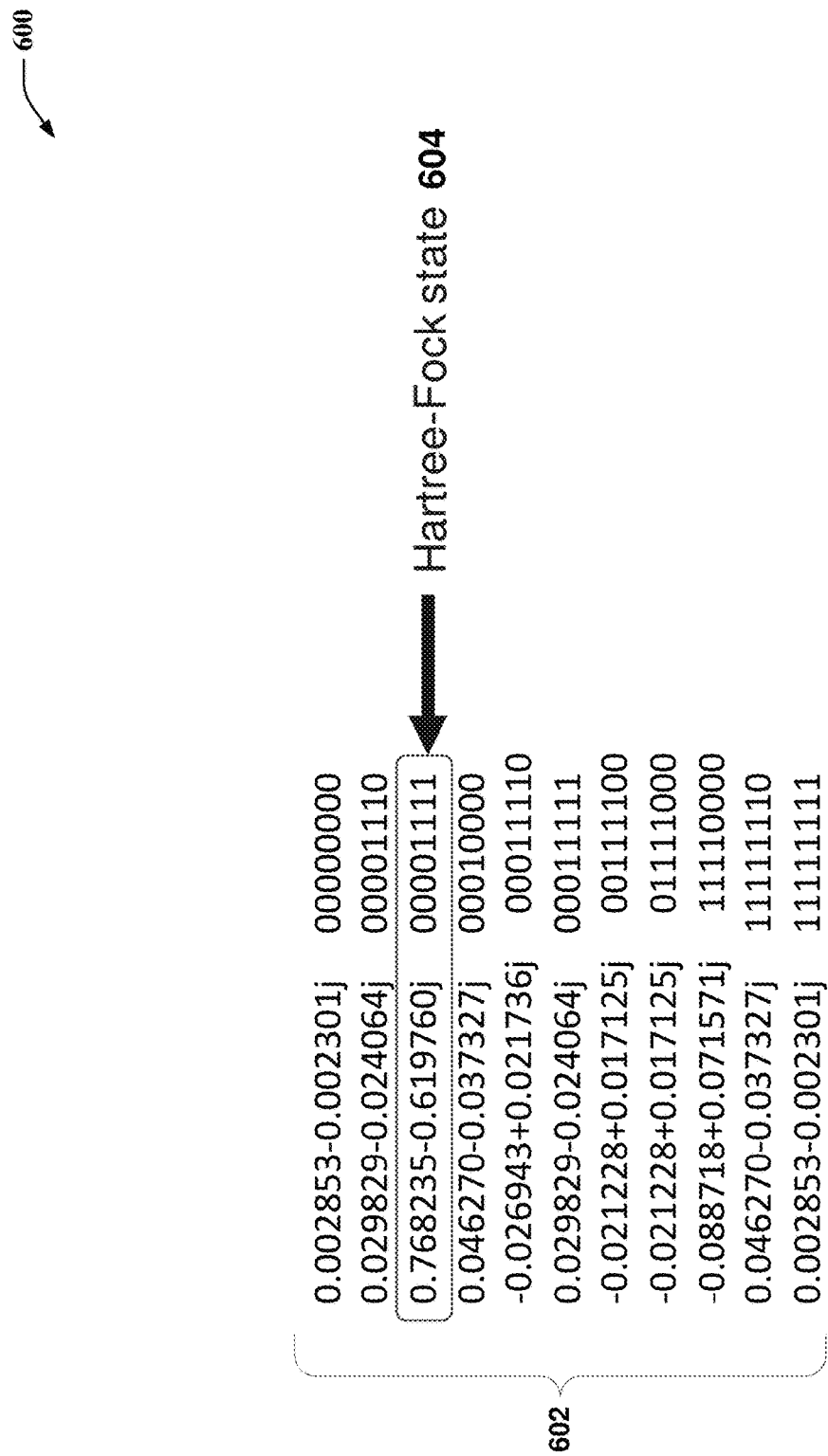
FIG. 6 illustrates a diagram of an example, non-limiting diagram that can facilitate state dependent calibration of qubit measurements in accordance with one or more embodiments described herein.

FIG. 6 illustrates a diagram of an example, non-limiting diagram 600 that can facilitate state dependent calibration of qubit measurements in accordance with one or more embodiments described herein. Repetitive description of like elements and/or processes employed in various embodiments described herein is omitted for sake of brevity.

In some embodiments, diagram 600 can comprise data corresponding to an example implementation of one or more of the embodiments of the subject disclosure described herein to sample from the ground state of an 8 qubit lithium hydride (LiH) molecule. Diagram 600 can comprise the exact ground state 602 for the LiH molecule in a Slater-type orbital basis set where n primitive Gaussian orbitals are fitted to a single Slater-type orbital (STO). For instance, diagram 600 can comprise a STO-3G molecular basis, using a qubit parity mapping, where its largest Hartree-Fock component is identified in FIG. 6 (denoted as Hartree-Fock state 604 in FIG. 6 and also referred to here as Hartree-Fock qubit state 604). In this example, the corresponding exact molecular energy is calculated at—−1.07808.

Based on the Hartree-Fock qubit state 604, calibration component 110 can bias the readout of the first 4 qubits to the ground state (−), corresponding to a $T_2$ threshold illustrated in FIG. 2, and the last 4 qubits to the excited state (+), corresponding to a $T_3$ signal threshold illustrated in FIG. 2.

State dependent readout calibration system 102 (e.g., via state prediction component 108, calibration component 110, execution component 302, readout component 304, readout error component 402, state assignment component 404) can perform a numerical experiment by sampling qubit states from the exact ground state 602 represented in FIG. 6 and using those samples to estimate average value and standard deviation of the LiH molecular energy.

State dependent readout calibration system 102 (e.g., via state prediction component 108, calibration component 110, execution component 302, readout component 304, readout error component 402, state assignment component 404) can perform such a numerical experiment under two settings: in the first one, a symmetric readout error for both excited state (+) and ground state (−) is picked for all the qubits, corresponding to the $T_1$ setting illustrated in FIG. 2. The errors used are $\varepsilon_+ = \varepsilon_- = 0.03$. In the second setting, state dependent readout calibration system 102 (e.g., via calibration component 110) can use biased readout error model for the first 4 qubits on the ground state (−), corresponding to a $T_2$ setting illustrated in FIG. 2, and a biased error of type $T_3$ for the last 4 qubits. The readout errors of $\varepsilon_- = 0.001$, $\varepsilon_+ = 0.05$ are set for the first 4 qubits, and conversely $\varepsilon_- = 0.05$, $\varepsilon_+ = 0.001$ for the last 4 qubits. Estimates for the molecular energies and variances in the two cases are obtained as follows:

First setup, symmetric readout error: −0.928+/−0.007.

Second setup, state-dependent readout calibration: −1.063+/−0.003.

The numerical experiment shows estimated molecular energies close to the exact molecular energy, and smaller variances for the state dependent readout calibration case implemented using state dependent readout calibration system 102, thereby confirming the advantage of implementing the subject disclosure in a practical application in accordance with one or more embodiments as described herein.

In some embodiments, state dependent readout calibration system 102 can be associated with various technologies. For example, state dependent readout calibration system 102 can be associated with quantum readout technologies, quantum computer technologies, quantum mechanics technologies, quantum computation technologies, quantum hardware and/or software technologies, quantum simulator technologies, quantum data processing technologies, and/or other technologies.

In some embodiments, state dependent readout calibration system 102 can provide technical improvements to systems, devices, components, operational steps, and/or processing steps associated with the various technologies identified above. For example, as described above with reference to FIGS. 1, 2, and 6, state dependent readout calibration system 102 can bias the excited state (+)/ground state (−) threshold for a qubit readout towards higher or lower signal values by defining thresholds $T_3$ or $T_2$, as illustrated in FIG. 2. In defining such thresholds at $T_2<T_1$ or $T_3>T_1$, calibration component 110 can bias the excited state (+)/ground state (−) threshold for the qubit readout towards a lower or higher signal value, thereby reducing the readout error for the ground state (−) or an excited state (+), which effectively reduces the readout error the qubit and/or a quantum circuit comprising the qubit. Therefore, the impact of readout errors in sampling from a qubit state at the end of the execution of a quantum circuit is mitigated, compared to the case in which state dependent readout calibration system 102 is not applied. State dependent readout calibration system 102 can improve on estimation on any observable on a set of qubits, including average values of Hamiltonians such as molecular ones. The improvements are greater for qubit superposition states which have support on a restricted number of qubit basis elements.

In some embodiments, state dependent readout calibration system 102 can provide technical improvements to a processing unit (e.g., processor 106, a quantum processor, etc.) associated with a classical computing device and/or a quantum computing device (e.g., a quantum processor, quantum hardware, superconducting circuit, etc.). For example, by reducing the readout error of a qubit and/or a quantum circuit comprising the qubit, state dependent readout calibration system 102 can facilitate improved accuracy of the computations and/or data processing workloads executed by such a processing unit (e.g., processor 106, a quantum processor, etc.), thereby improving performance while reducing computational costs of such a processing unit. For instance, by improving the accuracy of the results output by such a processing unit, state dependent readout calibration system 102 can reduce the number of execution cycles such a processing unit performs to achieve a defined desired computation and/or data processing result, which can improve the performance and reduce computational costs of such a processing unit.

In some embodiments, state dependent readout calibration system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. In some embodiments, state dependent readout calibration system 102 and/or components thereof, can be employed to solve new problems that arise through advancements in technologies mentioned above, employment of quantum computing systems, cloud computing systems, computer architecture, and/or another technology.

It is to be appreciated that state dependent readout calibration system 102 can utilize various combinations of electrical components, mechanical components, and circuitry that cannot be replicated in the mind of a human or performed by a human, as the various operations that can be executed by state dependent readout calibration system 102 and/or components thereof as described herein are operations that are greater than the capability of a human mind. For instance, the amount of data processed, the speed of processing such data, or the types of data processed by state dependent readout calibration system 102 over a certain period of time can be greater, faster, or different than the amount, speed, or data type that can be processed by a human mind over the same period of time.

According to several embodiments, state dependent readout calibration system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that state dependent readout calibration system 102 can include information that is impossible to obtain manually by an entity, such as a human user. For example, the type, amount, and/or variety of information included in state dependent readout calibration system 102, state prediction component 108, calibration component 110, execution component 302, readout component 304, readout error component 402, and/or state assignment component 404 can be more complex than information obtained manually by a human user.

Figure 7:
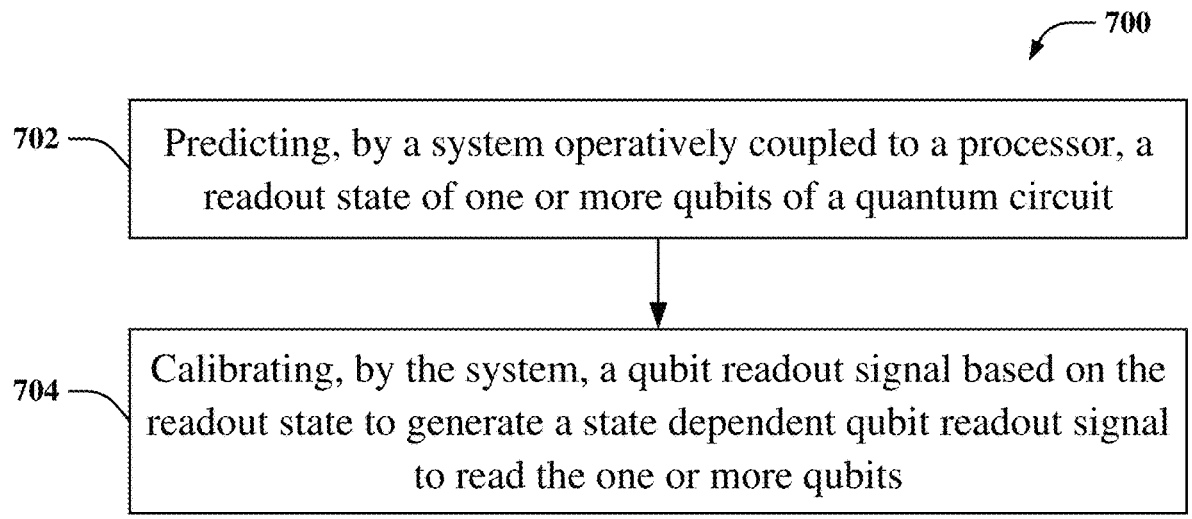
FIG. 7 illustrates a flow diagram of an example, non-limiting computer-implemented method that can facilitate state dependent calibration of qubit measurements in accordance with one or more embodiments described herein.

FIG. 7 illustrates a flow diagram of an example, non-limiting computer-implemented method 700 that can facilitate state dependent calibration of qubit measurements in accordance with one or more embodiments described herein. Repetitive description of like elements and/or processes employed in various embodiments described herein is omitted for sake of brevity.

In some embodiments, at 702, computer-implemented method 700 can comprise predicting, by a system (e.g., state dependent readout calibration system 102 and/or state prediction component 108) operatively coupled to a processor (e.g., processor 106, a quantum processor, etc.), a readout state (qubit state) of one or more qubits of a quantum circuit (e.g., a superconducting circuit). For example, as described above with reference to FIG. 1, state prediction component 108 can predict a readout state (e.g., ground state (−), excited state (+)) of one or more qubits of a quantum circuit by measuring the state of the one or more qubits of the quantum circuit at the end of the execution of the quantum circuit by employing one or more of the state prediction strategies described above (e.g., by estimating large amplitudes of the output quantum state based on classical approximations (e.g., Hartree-Fock states) and/or by performing a preliminary iteration of measurements and estimating for each qubit whether it is more likely to end in the ground or excited state) and/or another state prediction strategy.

In some embodiments, at 704, computer-implemented method 700 can comprise calibrating, by the system (e.g., state dependent readout calibration system 102 and/or calibration component 110), a qubit readout signal based on the readout state to generate a state dependent qubit readout signal (e.g., a ground state (−) dependent qubit readout signal, an excited state (+) dependent qubit readout signal) to read the one or more qubits (e.g., via execution component 302 and readout component 304). For example, as described above with reference to FIGS. 1 and 2, calibration component 110 can calibrate a qubit readout signal based on a readout state (e.g., ground state (−), excited state (+)) of a qubit to generate a state dependent qubit readout signal by defining a biased threshold value $T_2$ or $T_3$ of the qubit readout signal as illustrated and described above with reference to FIG. 2, where such biased threshold value $T_2$ or $T_3$ can be indicative of the readout state. For instance, calibration component 110 can bias the excited state (+)/ground state (−) threshold for the qubit readout towards higher or lower signal values, for example, by defining thresholds $T_3$ or $T_2$, as illustrated in FIG. 2. In calibrating a readout signal by defining such a threshold value $T_2$ or $T_3$ as described above, calibration component 110 can thereby generate a state dependent qubit readout signal. For example, in calibrating a readout signal by defining a threshold value at $T_2 < T_1$, calibration component 110 can thereby generate a ground state (−) dependent qubit readout signal. Conversely, as another example, in calibrating a readout signal by defining a threshold value at $T_3 > T_1$, calibration component 110 can thereby generate an excited state (+) dependent qubit readout signal.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
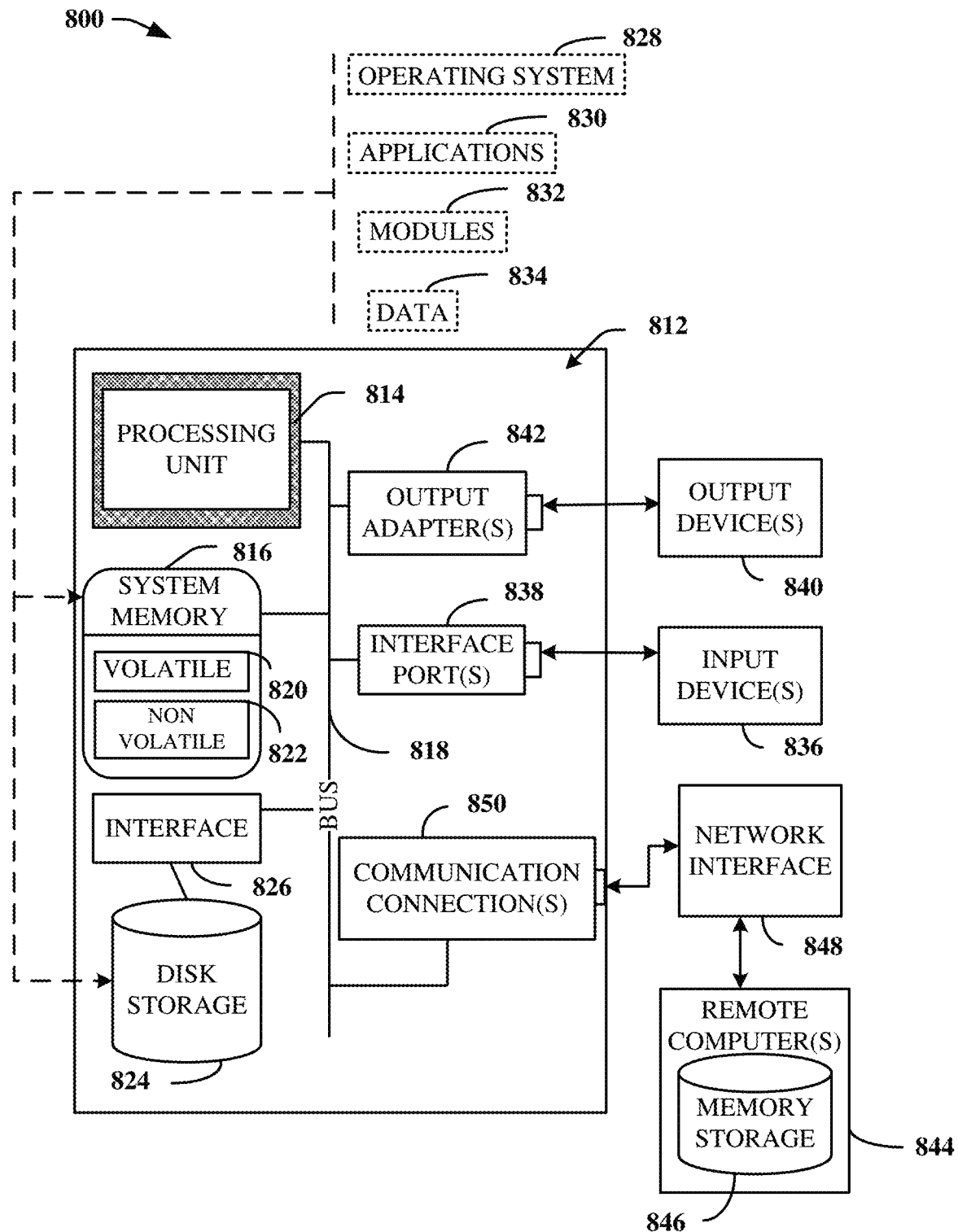
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
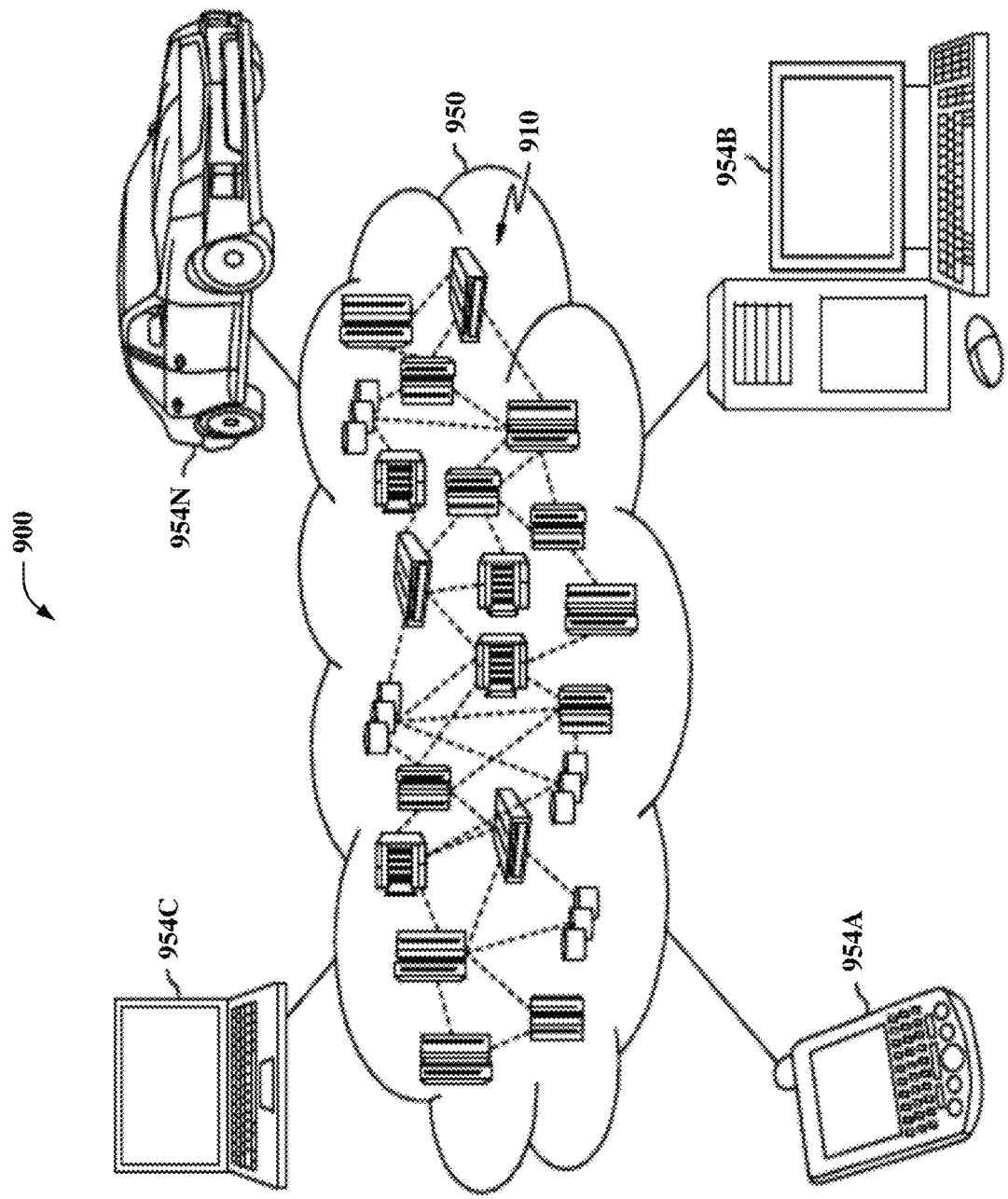
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
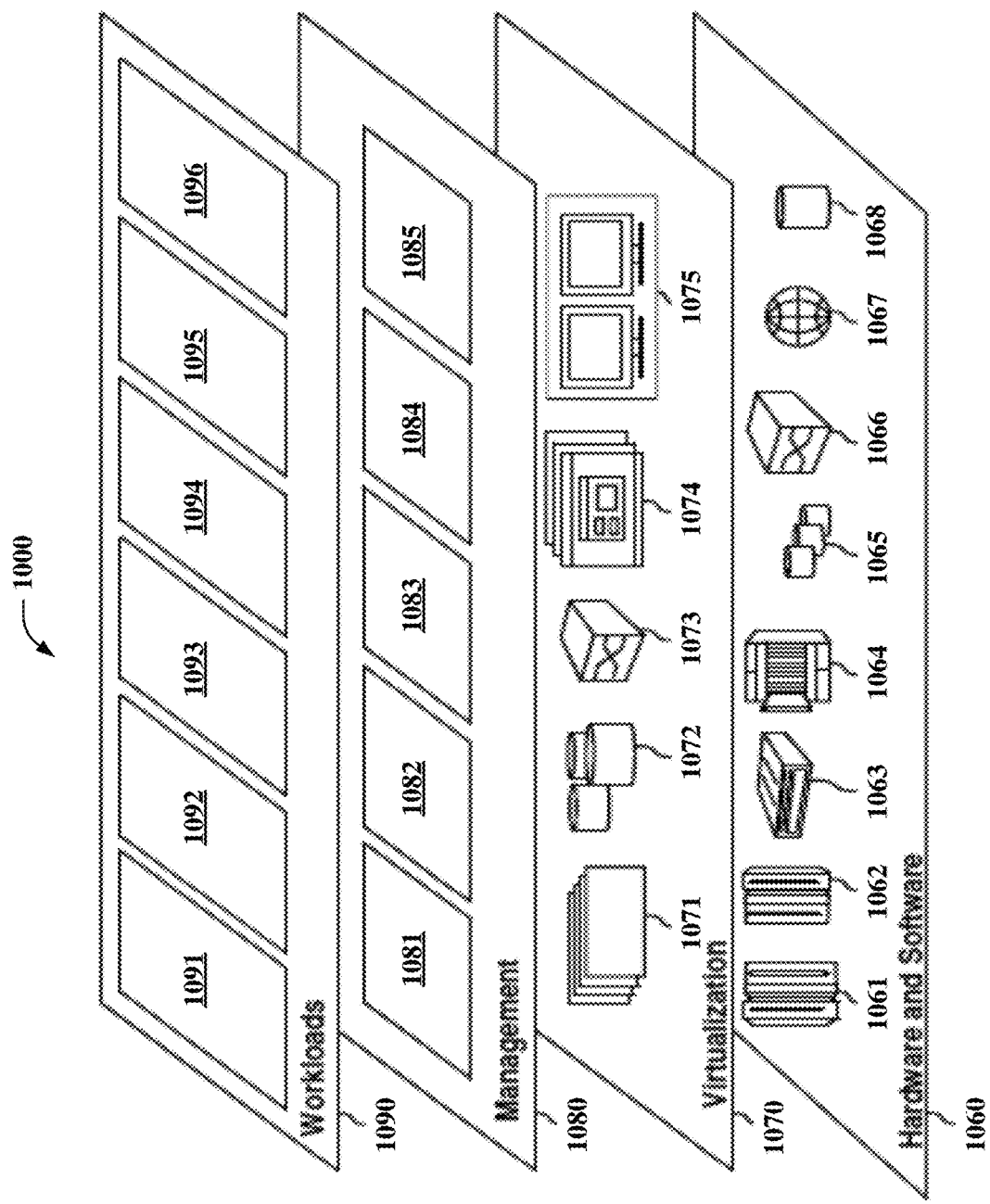
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and state dependent readout calibration software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
    a non-transitory memory that stores computer executable components; and
    a processor that executes the computer executable components stored in the memory, wherein the computer executable components comprise:
        a state prediction component that predicts a readout state of one or more qubits of a quantum circuit; and
        a calibration component that calibrates a qubit readout signal based on the readout state to generate a state dependent qubit readout signal to read the one or more qubits.
2. The system of claim 1, wherein the calibration component defines a biased threshold value of the qubit readout signal that is indicative of the readout state.
3. The system of claim 1, wherein the computer executable components further comprise:
    an execution component that executes the quantum circuit based on the state dependent qubit readout signal.
4. The system of claim 1, wherein the computer executable components further comprise:
    a readout component that reads the one or more qubits based on the state dependent qubit readout signal.
5. The system of claim 1, wherein the computer executable components further comprise:
    a readout error component that determines a qubit assignment statistical error value based on a biased threshold value of the qubit readout signal that is indicative of the readout state.

6. The system of claim 1, wherein the computer executable components further comprise:

a state assignment component that assigns a qubit state to the one or more qubits based on state dependent qubit readout performed on the one or more qubits using the state dependent qubit readout signal.

7. The system of claim 1, wherein the calibration component generates the state dependent qubit readout signal to facilitate reduced readout error of the one or more qubits.

8. A computer-implemented method, comprising:

predicting, by a system operatively coupled to a processor and a non-transitory memory, a readout state of one or more qubits of a quantum circuit; and calibrating, by the system, a qubit readout signal based on the readout state to generate a state dependent qubit readout signal to read the one or more qubits.

9. The computer-implemented method of claim 8, further comprising:

defining, by the system, a biased threshold value of the qubit readout signal that is indicative of the readout state.

10. The computer-implemented method of claim 8, further comprising:

executing, by the system, the quantum circuit based on the state dependent qubit readout signal.

11. The computer-implemented method of claim 8, further comprising:

reading, by the system, the one or more qubits based on the state dependent qubit readout signal.

12. The computer-implemented method of claim 8, further comprising:

determining, by the system, a qubit assignment statistical error value based on a biased threshold value of the qubit readout signal that is indicative of the readout state.

13. The computer-implemented method of claim 8, further comprising:

assigning, by the system, a qubit state to the one or more qubits based on state dependent qubit readout performed on the one or more qubits using the state dependent qubit readout signal.

14. The computer-implemented method of claim 8, further comprising:

generating, by the system, the state dependent qubit readout signal to facilitate reduced readout error of the one or more qubits.

15. A computer program product facilitating state dependent calibration of qubit measurements, the computer program product comprising a computer readable non-transitory storage medium having program instructions embodied therewith, the program instructions executable by a processor to cause the processor to:

predict, by the processor, a qubit state of one or more qubits of a quantum circuit; and calibrate, by the processor, a qubit readout signal based on a qubit state prediction to generate a state dependent qubit readout signal to read the one or more qubits.

16. The computer program product of claim 15, wherein the program instructions are further executable by the processor to cause the processor to:

define, by the processor, a biased threshold value of the qubit readout signal that is indicative of the qubit state prediction.

17. The computer program product of claim 15, wherein the program instructions are further executable by the processor to cause the processor to:

execute, by the processor, the quantum circuit based on the state dependent qubit readout signal.

18. The computer program product of claim 15, wherein the program instructions are further executable by the processor to cause the processor to:

read, by the processor, the one or more qubits based on the state dependent qubit readout signal.

19. The computer program product of claim 15, wherein the program instructions are further executable by the processor to cause the processor to:

determine, by the processor, a qubit assignment statistical error value based on a biased threshold value of the qubit readout signal that is indicative of the qubit state prediction.

20. The computer program product of claim 15, wherein the program instructions are further executable by the processor to cause the processor to:

assign, by the processor, a qubit readout state to the one or more qubits based on state dependent qubit readout performed on the one or more qubits using the state dependent qubit readout signal.

* * * * *